United States Patent [19]
Anselmo et al.

[11] 3,816,766
[45] June 11, 1974

[54] INTEGRATED CIRCUIT WITH HALL CELL
[75] Inventors: Robert A. Anselmo, San Jose, Calif.; Michael H. Oppenheimer, Williamstown; Robert C. Genesi, Sterling, both of Mass.
[73] Assignee: Sprague Electric Company, North Adams, Mass.
[22] Filed: Jan. 29, 1973
[21] Appl. No.: 327,555

[52] U.S. Cl. .............. 307/278, 307/290, 307/303, 307/309, 307/315, 317/235 E, 317/235 H, 317/235 R
[51] Int. Cl. ...................... H01v 5/00, H01l 19/00
[58] Field of Search ............ 317/235; 307/278, 290, 307/303

[56] References Cited
UNITED STATES PATENTS
3,305,790  2/1967  Parsons et al. ........................ 330/6
3,522,494  8/1970  Bosch .................................. 317/235
3,596,114  7/1971  Maupin et al. ....................... 307/278

*Primary Examiner*—John S. Heyman
*Assistant Examiner*—E. Wojciechowicz

[57] ABSTRACT

Described is an integrated circuit comprised of a hall cell, a differential amplifier and a current source; that operates as a sensitive magnetic-field-to-voltage transducer being essentially independent of ambient temperature changes.

7 Claims, 6 Drawing Figures

PATENTED JUN 11 1974 3,816,766

INTEGRATED CIRCUIT WITH HALL CELL

BACKGROUND OF THE INVENTION

The present invention relates to the use of hall cells as transducers in magnetic and monitoring sensing and-monitoring applications. A hall cell may be constructed of any material through which an electrical current may be passed. A voltage is detected between two lateral contacts on the hall cell whose axis is at right angles to the axis of the current flow and this output voltage is proportional to the product of the magnitude of the current flow and the strength of the magnetic field that is orthogonal to the two axes. The ratio of the magnitude of the output voltage to the strength of the orthogonal magnetic field is called the hall cell sensitivity. Most hall cells are now made of semiconductor materials since they provide high hall cell sensitivity. Hall cells made of exotic III—V materials such as gallium arsenide or indium antimonide have sensitivities on the order of 0.5 volt per kilograms.

Hall cells of silicon have roughly an order of magnitude less sensitivity. However their sensitivity is much more stable with temperature. The silicon hall cell offers the further advantage that it is readily incorporated into a conventional silicon integrated circuit. Such integrated circuits are made wherein the output signal from the hall cell is directly connected to the input of an adjacent amplifier on the same silicon chip. Others are made where the output of the hall cell is directly connected to a schmitt trigger circuit such that the trigger circuit output voltage jumps from a near zero value to about five volts when the slowly increasing magnetic field reaches a value of about 500 gauss. As the field decreases the output jumps from 5 volts to near zero again at the time when the magnetic field reaches about 200 gauss. Thus the circuit is said to exhibit hysteresis.

These typical combination hall cell integrated circuits have the common feature that they are normally temperature dependent. In the first mentioned combination the hall cell output signal increases and the gain of the amplifier transistors increase as temperature increases, thus resulting in a highly temperature dependent sensitivity. When such circuits are used to accurately measure the intensity of a magnetic field, care must be taken to insure a constant ambient temperature for the device. Otherwise a characteristic sensitivity versus temperature curve may be generated for each device so that when used for field measurements, a temperature correction can be made. Similarly, the characteristic performance of an integrated hall cell and trigger circuit device is temperature dependent. Typically the trigger points will change 25 percent over a temperature range of from 0° to 70° C.

It is therefore an object of the present invention to provide hall cell integrated circuits whose performance is substantially independent of the ambient temperature.

SUMMARY OF THE INVENTION

An integrated circuit magnetic field to electric signal transducer is comprised of a hall cell, a differential amplifier and a current source, which elements do themselves have changing performance characteristics with temperature but which together cooperate such that the overall coefficient of sensitivity of the integrated circuit transducer is substantially zero.

DESCRIPTION OF THE PREFERRED EMBODIMENT

Figure 1:
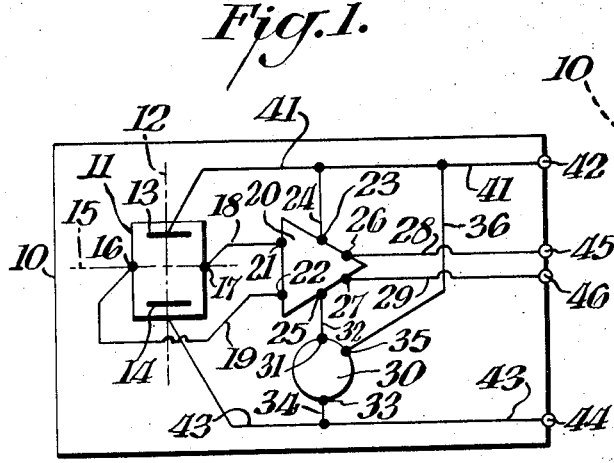
In FIG. 1 is shown a block diagram of an integrated circuit device according to a first and second preferred embodiment of the present invention.

In FIG. 1 is shown a block diagram of a first preferred embodiment of the present invention. Block 11 represents a hall cell, block 20 a differential amplifier and block 30 a constant current source. The components making up each of these blocks are all formed by integrated circuit techniques within or on a silicon body represented by the area within the rectangle 10.

Two broad contacts 13 and 14 are located on an axis 12 and at opposite ends of the hall cell 11. Two sensing terminals 16 and 17 are located on a second axis 15, perpendicular to the axis 12, and at opposite sides of the hall cell 11.

The amplifier 20 has two differential input contacts 22 and 21 that are connected to the hall cell sensing contacts 16 and 17. The amplifier differential output terminals 26 and 27 are connected to terminals 45 and 46, which are shown at the edge of the body 10 thus indicating their accessibility external to the body of the integrated circuit device. The amplifier is powered by a d.c. energy source connected to terminals 23 and 25.

The current source 30 provides a constant current through the amplifier, the constant current flowing in series fashion from current source terminal 33 to terminal 31 then through conductor 32 to amplifier terminal 25 and through the amplifier 10 to terminal 23. The current source, also receives energy directly from the external d.c. energy source by terminals 35 and 33.

Externally accessible terminals 42 and 44 are provided for connection to an external direct current (d.c.) energy source (not shown) and more particularly in this preferred embodiment a d.c. voltage source, with terminal 42 being positive and terminal 44 being negative.

For delivering energy to the hall cell 11, the amplifier 20, and the current source 30, there is provided integral with the body 10, circuit means comprised of conductors 41, 24 and 36 that connect the first source terminal 42 and further comprising conductors 43 and 34 that connect the second source terminal 44. Thus the hall cell 11 is directly connected to the voltage source; the amplifier 20 and current source 30 are supplied in series by the voltage source, and the current source 30 is additionally powered by a direct connection at terminals 35 and 33 to the voltage source.

Now with a d.c. voltage connected to terminals 42 and 44, the differential voltage appearing across terminals 45 and 46 is directly proportional to a portion of a magnetic field in the hall cell, which field portion lies orthogonal to axes 12 and 15.

Figure 2:
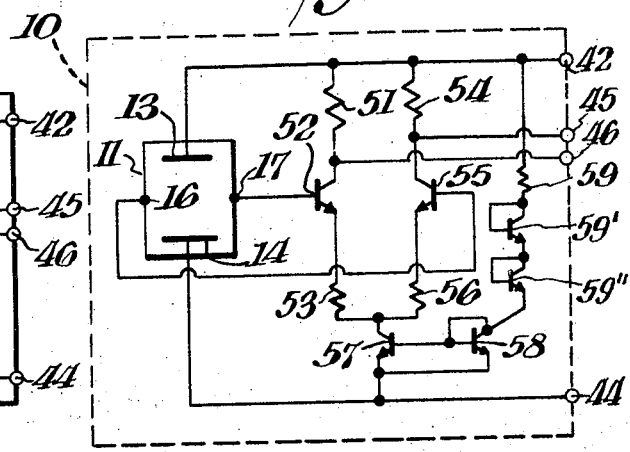
In FIG. 2 is shown a detailed circuit schematic of a first preferred embodiment of FIG. 1.

A more detailed description of this first preferred embodiment is presented with reference to FIG. 2. The differential amplifier circuit contains a pair of planar diffused transistors 52 and 55 having been formed simultaneously and being matched, and a pair of matched collector resistors 51 and 54, having been formed in an epitaxial layer of about 1 ohm-cm resistivity, that are associated with the pair of transistors such that resistor 52 is connected to the collector of transistor 51 and the resistor 54 is connected to the collector of transistor 55. The amplifier also contains a pair of matched (B & R) diffused emitter resistors 53 and 56 that are connected to the emitters of transistors 52 and 55, respectively. The bases of the transistors 52 and 55 constitute the amplifier input and are connected to the hall cell sensing terminals 17 and 16, respectively. The differential output signal of the amplifier is seen between the collectors of transistors 52 and 55, which output is made accessible external to the device by connection to terminals 45 and 46.

The current source is made up of diffused planar transistors 57, 58, 59' and 59'' having identical structures and having been formed simultaneously, and a resistor 59 having been formed by B & R diffusion.

The bases of transistors 57 and 58 are connected to each other, to the collector of transistor 58, and to the series combination of transistors 59' and 59'' and resistor 59, through which connection is made to the first source terminal 42. Transistors 59' and 59'' have their bases shorted to their collectors. The emitters of transistors 57 and 58 are connected to each other and to the second source terminal 42. The collector of transistor 57 is connected to the two amplifier emitter resistors 53 and 56.

The hall cell in this embodiment is also formed in the epitaxial layer such that the temperature coefficients of resistance of the hall cell and collector resistors 51 and 54, all have about the same value, namely in this embodiment about +7,000 ppm/° C. The hall cell sensitivity increases about 35 percent over a temperature range of 0° to 70° C.

The current source is connected in series with the amplifier so as to regulate and hold constant the sum of the currents in the parallel circuit branches in the amplifier containing transistors 42 and 55, respectively. The magnitude of the regulated constant current flowing through transistor 57 is made approximately equal to the current flowing through transistor 58 and resistor 59 since the two transistor emitter-base junctions are made simultaneously and have the same geometry.

The emitter resistors are so called base-diffused (B & R) and have a temperature coefficient of resistance on the order of +1,500 ppm. It will be recognized by those skilled in the art that, for this circuit, as the temperature of the silicon body rises, the amplifier gain tends to decrease with increasing values of the emitter resistors, tends to increase with increasing values of the collector resistors, tends to decrease with changing parameters of the amplifier transistors, and tends to decrease as the "constant current" decreases which current decreases principally due to the increasing value of resistor 59 and a change of −2mv/° C across each of the emitter junctions of transistors 58, 59' and 59'' in the current source. As temperature rises the sensitivity of the hall cell decreases due principally to its increasing resistivity and consequently decreasing current flow between terminals 13 and 14. It will now become apparent that a wide range of temperature coefficients of overall sensitivity can be achieved, employing the circuit and the particular combination of component construction techniques of this preferred embodiment, by balancing the temperature characteristics of the components in a compensating manner for achieving the particular value of temperature coefficient of overall sensitivity that is desired. It will also be apparent that this particular circuit and component construction is a highly practical one, requiring a minimum of process steps and employing the technique of simultaneous formation of components such that paired components 11 and 51 and 54, 52 and 55, 53 and 56, 57 and 58 have nearly identical characteristics with high yield in production.

The device of the first preferred embodiment is designed to operate with a supply voltage of 5 volts and has an overall sensitivity of about 2.7 volts per kilogauss which changes, over the temperature range of 0° to 70° C, no more than 5 percent. Non linearity in the temperature characteristics of the various key components makes a much closer compensation impractical over this temperature range. This particular embodiment however leads to highly uniform compensation from piece to piece in production using standard processes and normal process controls.

Also the simple expedient of adding additional transistors (diodes) to the series combination of transistors 59' and 59'' provides a more negative temperature coefficient (TC) of over-all sensitivity while eliminating such transistors (diodes) will cause the TC of sensitivity to become more positive. The addition of such transistors will probably require the use of a higher supply voltage. In any case the attractive feature of high reproducibility will be preserved.

In a second preferred embodiment the circuit of FIG. 2 is modified whereby transistors 59' and 59'' are eliminated and replaced by a conductive short. Resistors 53, 56, and 59 become ion implanted types having a TC of resistance of about +200 ppm/° C. All other components are formed as described for use in the first preferred embodiment. In this case the current source provides a "constant current" that decreases slightly with temperature tending to reduce the amplifier gain. The amplifier gain also drops slightly with temperature as the low TCR emitter resistors 53 and 56 increase slightly in value. But the epitaxially formed collector resistors compensate these effects plus the strong reduction in sensitivity of the hall cell with temperature providing a transducer device having an overall sensitivity that changes less than 5 percent over the temperature range of from 0° to 70° C.

Devices made according to this second preferred embodiment are also highly reproducible but the ion implantation step tends to add extra cost.

Figure 3:
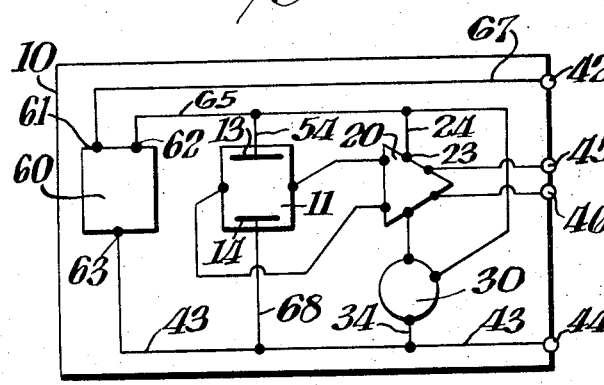
In FIG. 3 is shown a block diagram of an integrated circuit device according to a third preferred embodiment of the present invention.

In FIG. 3 is shown a block diagram of a third preferred embodiment of the present invention. It is the same as the block diagram of the first preferred embodiment of FIG. 1, except that an on-board voltage regulator block 60 is included in the integrated circuit formed on silicon body 10. The hall cell 11, the amplifier 20 and the current source 30 all cooperate in the same manner as before but they all obtain electrical energy directly from the on-board regulator 62 from terminals 62 and 63 which regulator 60 in turn receives its energy through terminals 61 and 63 from a voltage source (not shown) external to the body 10 with a positive polarity at terminal 42 and a negative polarity at terminal 44.

The positive terminal 62 of the on-board regulated voltage source 60 is connected to the current source 30, the amplifier 20 and the hall cell 11 by conductors 65, 24, and 54 respectively. The common negative terminal 62 of the on-board regulator 60 is connected by conductors 43, 68 and 34 to the hall cell 11, the current source 30 and terminal 44. The voltage applied to terminals 44 and 42 may vary over a wide range while the regulated voltage between terminals 62 and 63 remains constant.

Figure 4:
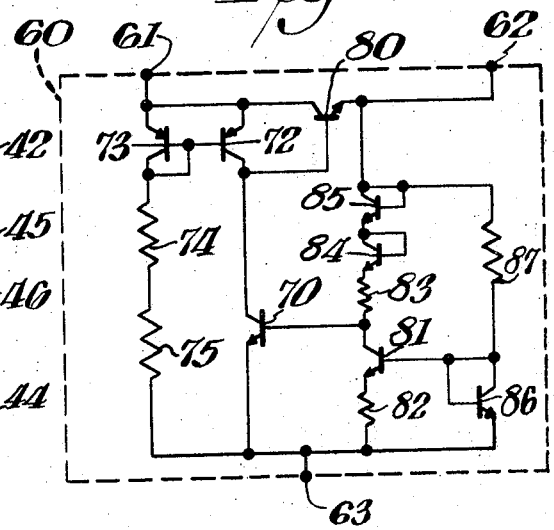
In FIG. 4 is shown a detailed circuit schematic of a voltage regulator portion of the third preferred embodiment of FIG. 3.

In FIG. 4 is shown the voltage regulator circuit represented by block 60 in FIG. 3. The basic control element is the series regulator transistor 80, regulating the current flow from terminal 61 to terminal 62. The network containing transistors 72 and 73, and resistors 74 and 75, constitutes a constant current source load in the collector circuit of transistor 70. The collector of transistor 70 is connected to the base of transistor 80 and thus transistor 70 serves to steer current to or from the base of transistor 80. A stable reference current is established in resistor 83 and changes in voltage at terminal 62 are strongly felt at the collector of transistor 81 such that the transistor 70 robs more or less current from the base of the series regulator transistor 80. In this manner the voltage of terminal 62 is held constant for changes in voltage supplied to terminal 61. The circuit is arranged such that the base to emitter voltages of transistors 70, 81, 86, 84, and 85 cooperate to compensate for temperature changes. Thus the output voltage between terminals 62 and 63 is constant over a broad temperature range and for a wide range of supply voltage applied between terminals 61 and 63. A detailed explanation of the operating principles of voltage regulator circuits of this type are given by Robert J. Widlar in New Developments in IC Voltage Regulators, IEEE Journal of Solid State Circuits, Vol. SC6, No. 1, February 1971.

Figure 5:
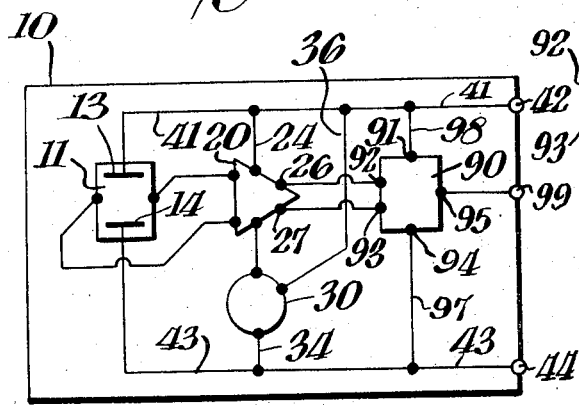
In FIG. 5 is shown a block diagram of an integrated circuit device according to a fourth preferred embodiment of the present invention.

In FIG. 5 is shown a block diagram of a fourth preferred embodiment of the present invention. It is the same as the block diagram of the first preferred ebodiment of FIG. 1, except that an on-board schmitt trigger circuit, block 90 is included in the integrated circuit formed on silicon body 10. The hall cell 11, the amplifier 20 and the current source 30 all cooperate in the same manner as before, and the trigger circuit obtains electrical energy from the same external voltage source (not shown) that is connected with positive polarity at terminal 42 and negative polarity at terminal 44.

The differential output from amplifier terminals 26 and 27 are connected to trigger circuit input terminals 92 and 93, respectively, the single ended output terminal 95 of the trigger circuit is connected to the externally accessible terminal 99. Trigger circuit terminals 91 and 94 connect respectively by conductors 98 and 97 to conductors 41 and 43 which lead to the external voltage source 42 and 44, respectively.

Figure 6:
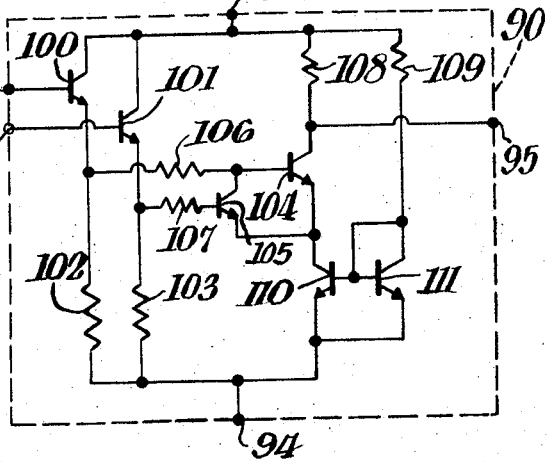
In FIG. 6 is shown a detailed circuit schematic of a schmitt trigger circuit portion of the fourth preferred embodiment of FIG. 5.

In FIG. 6 is shown the schmitt trigger circuit represented by block 90 in FIG. 5. Transistor 100 with emitter resistor 102 function as an emitter follower amplifier as do transistor 101 and emitter resistor 103. The output signal from the amplifier 20 is fed to the two bases of the emitter followers. It experiences power gain and is subsequently applied through resistors 106 and 107 to the bases of transistors 104 and 105, respectively. Transistor 105 is normally on for the condition of zero signal between input terminals 92 and 93, and its collector current flowing through resistor 106 drops the voltage of the collector of transistor 105 and holds transistor 104 off. As the input signal rises with terminal 92 positive relative to terminal 93, transistor 105 turns off as transistor 104 turns on causing current to flow in the collector resistor 108 of transistor 104 and thus causing the output signal at terminal 95 to jump from the positive voltage supply potential to a lower value. As the input signal is then decreased, a point is reached at which the output signal jumps back to its original state and with hysteresis as described previously herein. The transistors 110 and 111 and resistor 109 form a current source similar to that described earlier for current source 30. Thus the same current flows through transistor 105 in its on-state as flows through transistor 104 in its on-state. The width of the hysteresis characteristic is a function of the ratio of the values of resistors 106 and 107. Temperature compensation within the schmitt trigger circuit may be made substantially effective over the range of 0° to 70° C by conventional temperature compensating techniques including the adjustment of the relative geometries of the emitter junction of transistors 104 and 105.

What is claimed is:

1. A temperature-stabilized integrated-circuit magnetic-field to electric-signal transducer comprising:
    a. a semiconductor body of silicon having formed on a portion thereof an epitaxial layer;
    b. a hall cell formed of said epitaxial layer material having at opposite ends two main contacts lying in a main axis thereof and having at other opposite sides two sensing contacts lying in a second major axis that is at right angles to said main axis;
    c. a differential amplifier being formed in said epitaxial layer, comprising a pair of planar transistors, the bases of which are connected to said sensing contacts, and a pair of collector resistors formed of said epitaxial material, the differential output points of said amplifier corresponding to the collectors of said pair of transistors, so that the temperature coefficient of resistance characterizing said epitaxial layer material determines the sensitivity of said hall cell as well as substantially determining the temperature coefficient of gain of said amplifier; and
    d. a current source circuit formed in said epitaxial layer, and being connected to the emitters of said pair of amplifier transistors in order to regulate the sum of the collector currents in said pair of transistors, said current source circuit comprising two equal geometry planar transistors having their bases interconnected and their emitters interconnected in normal current source fashion, and a series reference-current circuit composed of a resistor and one or more diode connected transistors, said one or more diode connected transistors thus being capable of further determining the temperature coefficient of gain of said amplifier and thus contributing to the temperature stabilization of said transducer.

2. The transducer of claim 1 wherein said connection between said current source and said emitters of said pair of amplifier transistors is accomplished through two emitter resistors having been formed in said layer by a normal base diffusion step.

3. The transducer of claim 1 further comprising a schmitt trigger circuit means being formed in said body wherein said output of said amplifier is connected to the input terminals of said schmitt trigger circuit, for the purpose of providing a binary output such that when the strength of a portion of a magnetic field being orthogonal to said axes is increasing and exceeds a first predetermined value, the output of said schmitt trigger circuit changes from a first voltage level to a second voltage level, and when said strength of said portion of said magnetic field is decreasing and falls below a second predetermined value, the output of said schmitt trigger circuit changes from said second voltage level to said first voltage level, said second predetermined value of magnetic field strength being less than said first predetermined value.

4. The transducer of claim 1 further comprising a d.c. electrical energy source consisting of a conventional voltage regulator circuit formed within said body, and connective provisions for supplying electrical energy to said regulator from a source external to said transducer, said regulated voltage being connected to said hall cell, said amplifier and said current source.

5. A temperature-stabilized integrated-circuit magnetic-field to electric-signal transducer comprising:
   a. a semiconductor body of silicon having formed on a portion thereof an epitaxial layer of about 1 ohm-cm. and having a temperature coefficient of resistance of about +7,000 ppm;
   b. a hall cell formed of said epitaxial layer material having at opposite ends two main contacts lying in a main axis thereof and having at other opposite sides two sensing contacts lying in a second major axis that is at right angles to said main axis;
   c. a differential amplifier being formed in said epitaxial layer, comprising a pair of planar transistors, the bases of which are connected to said sensing contacts, and a pair of collector resistors formed of said epitaxial material, the differential output points of said amplifier corresponding to the collectors of said pair of transistors, so that the temperature coefficient of resistance characterizing said epitaxial layer material determines the sensitivity of said hall cell as well a substantially determining the temperature coefficient of gain of said amplifier; and
   d. a current source circuit formed in said epitaxial layer, and being connected to said pair of emitter resistors in order to regulate the sum of the collector currents in said pair of transistors, said current source comprising two equal geometry planar transistors having bases interconnected and emitters interconnected in normal current source fashion, and a reference current circuit having a series resistor, said series resistor and said pair of emitter resistors having been formed by a normal ion implantation step, and having a temperature coefficient of resistance on the order of +200 ppm.

6. The transducer of claim 5 further comprising a schmitt trigger circuit means being formed in said body wherein said output of said amplifier is connected to the input terminals of said schmitt trigger circuit, for the purpose of providing a binary output such that when the strength of a portion of a magnetic field being orthogonal to said axes is increasing and exceeds a first predetermined value, the output of said schmitt trigger circuit changes from a first voltage level to a second voltage level, and when said strength of said portion of said magnetic field is decreasing and falls below a second predetermined value, the output of said schmitt trigger circuit changes from said second voltage level to said first voltage level, said second predetermined value of magnetic field strength being less than said first predetermined value.

7. The transducer of claim 5 further comprising a d.c. electrical energy source consisting of a conventional voltage regulator circuit formed within said body, and connective provisions for supplying electrical energy to said regulator from a source external to said transducer, said regulated voltage being connected to said hall cell, said amplifier and said current source.

* * * * *